United States Patent
Puide et al.

(10) Patent No.: US 6,402,439 B1
(45) Date of Patent: Jun. 11, 2002

(54) TOOL FOR CHIP REMOVAL MACHINING

(75) Inventors: Mattias Puide, Fagersta; Johnny Bruhn, Norberg; Mikael Grönkvist, Norrköping, all of (SE)

(73) Assignee: Seco Tools AB, Fagersta (SE)

(*) Notice: Subject to any disclaimer, the term of this patent is extended or adjusted under 35 U.S.C. 154(b) by 25 days.

(21) Appl. No.: 09/607,362

(22) Filed: Jun. 30, 2000

(30) Foreign Application Priority Data

Jul. 2, 1999 (SE) ................................................ 0002293

(51) Int. Cl.[7] ............................................... B23B 51/02
(52) U.S. Cl. ......................... 408/144; 408/59; 408/230
(58) Field of Search .............................. 408/57, 59, 144, 408/227, 229, 230, 226; 407/118, 119

(56) References Cited

U.S. PATENT DOCUMENTS

| 3,336,614 A | * | 8/1967 | Benjamin | 408/144 |
| 4,642,003 A | * | 2/1987 | Yoshimura | 408/144 |
| 4,779,440 A | | 10/1988 | Cleve et al. | |
| 4,813,823 A | * | 3/1989 | Bieneck | 408/59 |
| 5,947,660 A | | 9/1999 | Karlsson et al. | |

FOREIGN PATENT DOCUMENTS

| JP | 130111 A | * | 6/1987 | 408/144 |
| JP | 240215 A | * | 9/1989 | 408/144 |
| JP | 95506 A | * | 4/1990 | 408/144 |
| JP | 73210 A | * | 3/1991 | 408/144 |
| JP | 170215 A | * | 7/1991 | 408/144 |
| JP | 92329 A | * | 4/1993 | 408/144 |
| WO | WO98/28455 | | 7/1998 | |

* cited by examiner

Primary Examiner—Daniel W. Howell
(74) Attorney, Agent, or Firm—Burns, Doane, Swecker & Mathis, L.L.P.

(57) ABSTRACT

A tool such as a drill or end mill has a central portion formed of a relatively tough hard material connected to an outer peripheral portion formed of relatively wear resistant hard material, i.e., the outer peripheral portion is more brittle and wear resistant than the central portion. The chip flutes of the tool are disposed only in the outer peripheral portion and thus are formed entirely of relatively wear resistant hard material.

15 Claims, 5 Drawing Sheets

TOOL FOR CHIP REMOVAL MACHINING

FIELD OF THE INVENTION

The present invention relates to a tool for chip removing machining comprising a relatively tough core connected to a relatively wear resistant outer periphery, and to methods and apparatus for making the tool.

BACKGROUND OF THE INVENTION

It is previously known through for example WO 98/28455 to press a core and a surrounding tube of material powder in two steps. The material powder comprises tungsten carbide (WC) together a with cobalt (Co) binder that are compressed between a punch and a die, and that subsequently are sintered such that the binder metal is melted and binds the carbide to form a tool material for chip removing machining. Thus, there results a tube formed around, and connected to, an inner core. The core has a higher binder (cobalt) ratio than does the tube, whereby the core is tougher than the tube, but the tube is harder and more wear resistant than the core.

That known technique brings about a plurality of drawbacks during manufacture of elongated slender bodies. The powder gives off dust, and the formed green body (pressed but not sintered material) will not endure handling to any degree. Furthermore the chip flutes must be formed by grinding which is time consuming. The problems have partly been solved by the injection molding of hard metal mixed in a carrier such as indicated in U.S. Pat. No. 5,947,660. The method of injection molding brings about a high degree of freedom concerning geometry but brings about troubles during manufacture of elongated slender bodies and costly investments in molds.

U.S. Pat. No. 4,779,440 discloses that an extruded drill blank having chip flutes of constant pitch along the circumference of the blank can be obtained by heating a hard metal powder to extrusion temperature, and pressing the heated powder under high energy consumption through a space defined by a mandrel and a nozzle while rotating the blank. The blank is guided during the extrusion step past a helical ridge provided inside of the nozzle, to shape chip flutes along the blank. A drawback of the known technique is that the useful life of the tool is less than desired.

OBJECTS OF THE INVENTION

One object of the present invention is to provide a tool, whereby the drawbacks of the known technique are eliminated.

Another object of the present invention is to provide a tool having optimum length of service time.

SUMMARY OF THE INVENTION

These and other objects have been achieved by a tool for chip removing machining. The tool comprises a shank having at least one cutting edge at a front end thereof, and a corresponding number of chip flutes for conducting chips generated by the respective cutting edge. A radially central portion of the shank is formed of a first hard material, and a radially outer peripheral portion of the shank is formed of a second hard material. The second hard material is harder and less tough than the first hard material. The radially outer peripheral portion is of sufficient thickness that the at least one chip flute is formed entirely therein.

BRIEF DESCRIPTION OF THE DRAWINGS

The objects and advantages of the invention will become apparent from the following detailed description of a preferred embodiment thereof in connection with the accompanying drawings in which like numerals designate like elements and in which:

FIG. 2B is a longitudinal sectional view taken along the line IIB—IIB in

FIG. 2A;

DETAILED DESCRIPTION OF A PREFERRED EMBODIMENT OF THE INVENTION

Figure 1B:
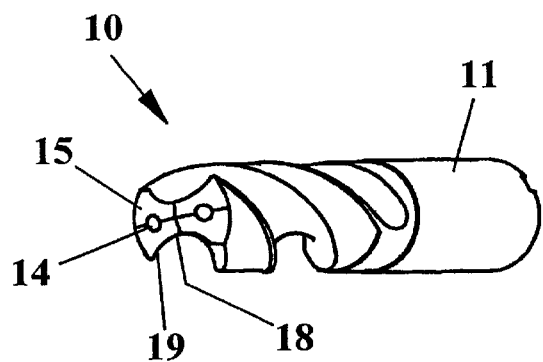
FIG. 1B is a front perspective view of the tool depicted in FIG. 1A.
Figure 1A:
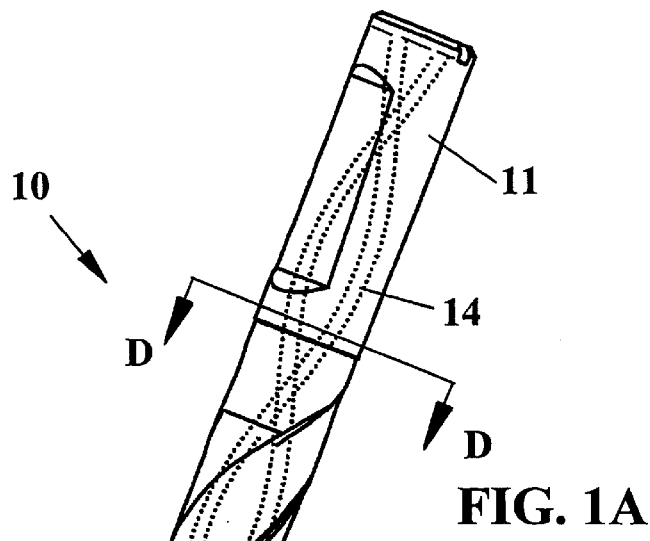
FIG. 1A is a schematic side elevational view of a tool formed in accordance with the present invention.
Figure 1C:
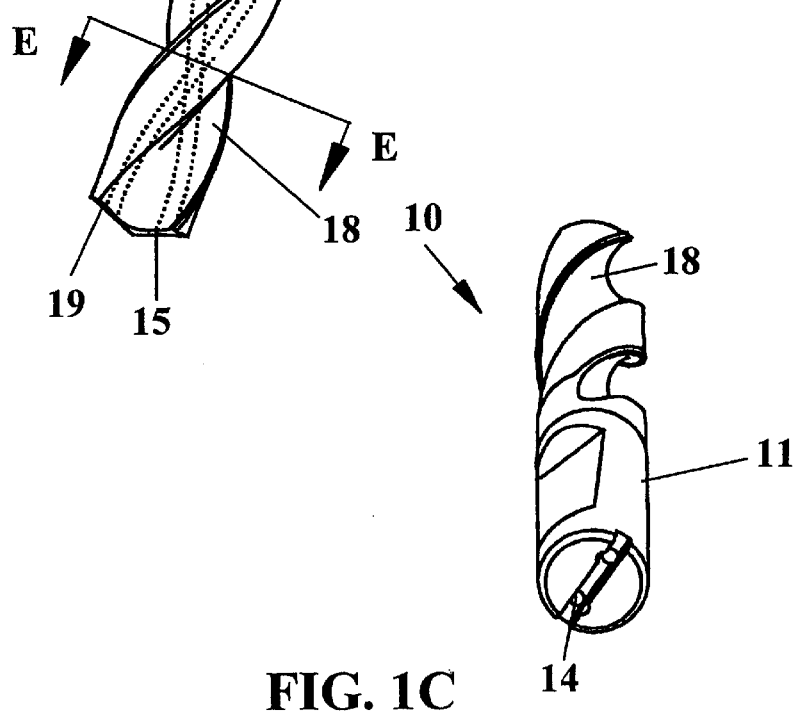
FIG. 1C is a rear perspective view of the tool depicted in FIG. 1A.

The embodiment of a tool shown in FIGS. 1A–1C is a so-called helix drill. The drill 10 comprises a substantially solid shank 11 having a first tip forming end comprising at least one cutting edge 19, and a number of chip flutes 18 that are equal in number to the cutting edges. The drill comprises a central core portion of relatively tough hard material connected to an outer peripheral tube portion 13 of relatively wear resistant hard material. The drill 10 is made of solid hard material, such as extruded hard metal, and the helical chip flutes 18 can extend along the entire body or along a part thereof. The shank 11 shall be secured into a rotatable spindle, not shown. The drill has two upper clearance surfaces 15.

The drill is extruded from two different materials where the difference between the materials lies in the relative ratio of hard substance (for example tungsten carbide, WC) to binder (for example cobalt, Co). That is, the central portion has a larger binder ratio than the outer peripheral portion and thus is tougher, but less brittle (less wear resistant) than the outer portion. All external surfaces and associated edges are made from the same material, i.e. extruded wear resistant hard metal with a relatively low content of cobalt. The chip flutes 18 of the tool 10 are formed entirely of wear resistant hard material that gives both strength and wear resistance to the drill. That is, the radial thickness of the hard tube portion is large enough that flutes of ample depth can be formed entirely therein. For example, as can be seen from FIG. 1E, a minimum thickness Y of the tube portion 13 at the deepest part of the flute 18 is at least as great as one-twentieth of the maximum drill diameter $$D \left( \text{i.e., } Y \geq \frac{D}{20} \right).$$

Figure 1D:
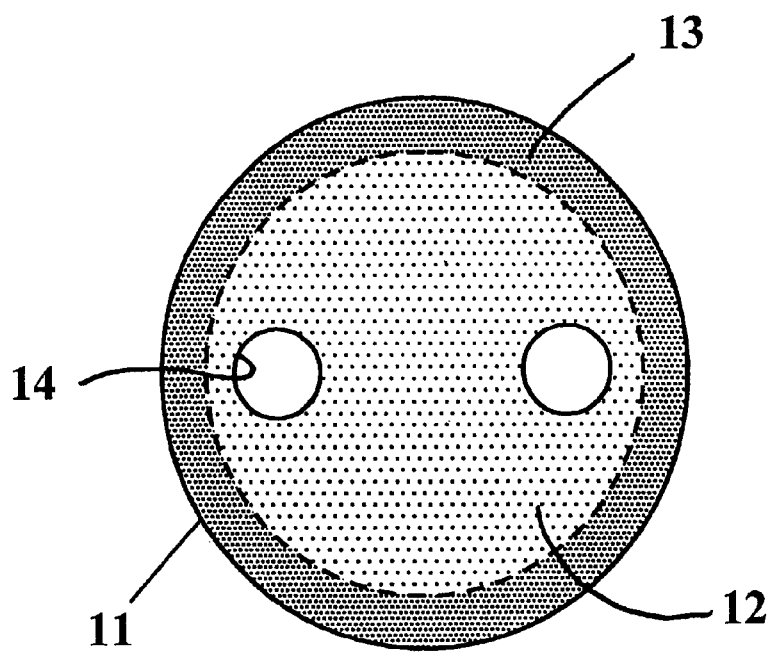
FIG. 1D is a cross-sectional view taken along the line D—D in FIG. 1A.
Figure 1E:
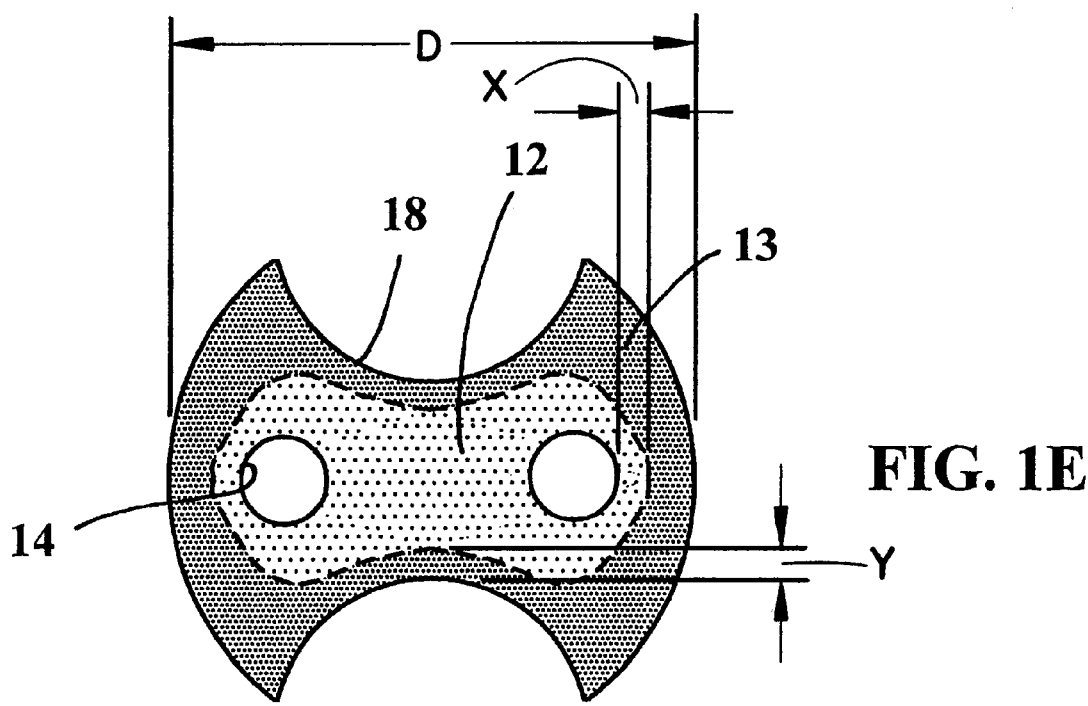
FIG. 1E is a cross-sectional view taken along the line E—E in FIG. 1A.
Figure 2A:
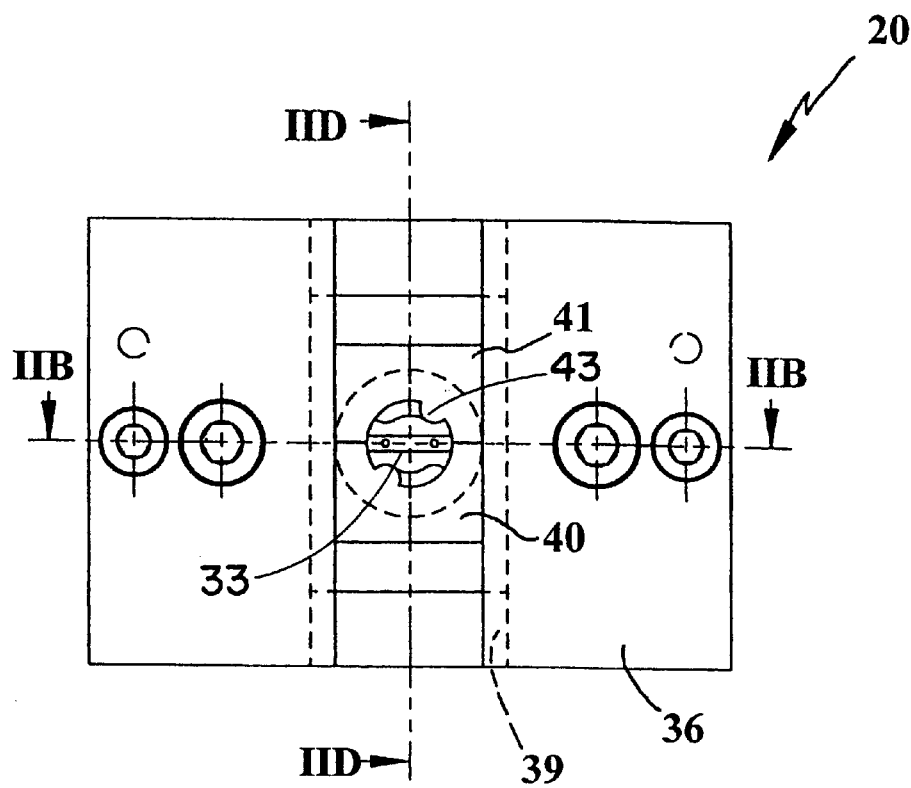
FIG. 2A is a front elevational view of an apparatus for the manufacture of elongated green bodies, according to the present invention.
Figure 2B:
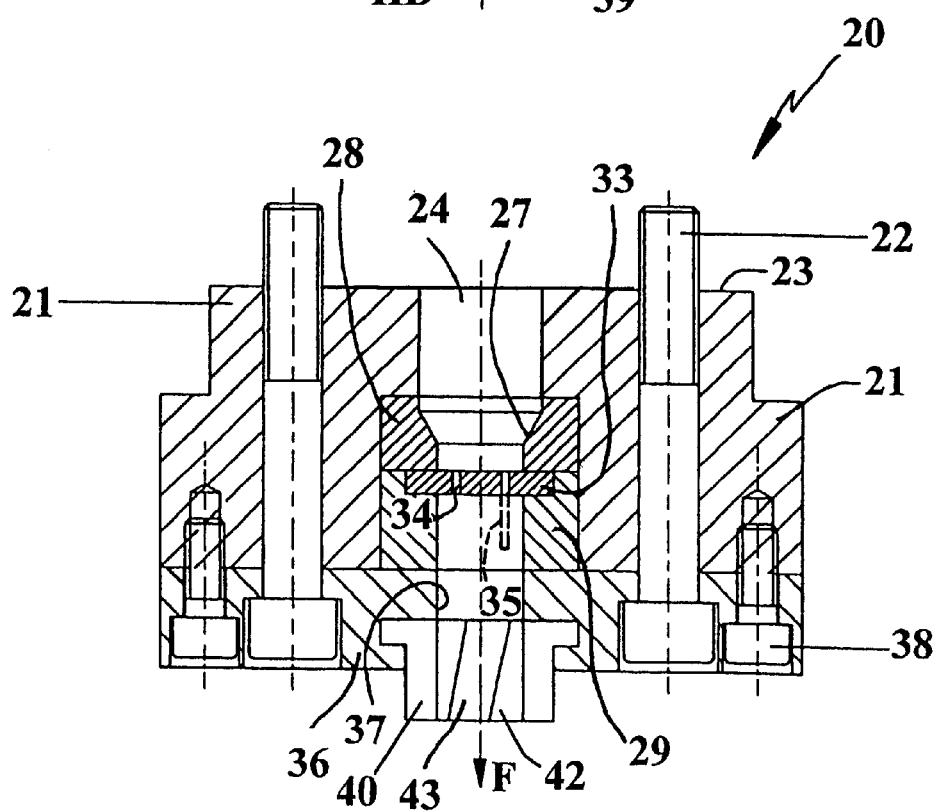
Figure 2C:
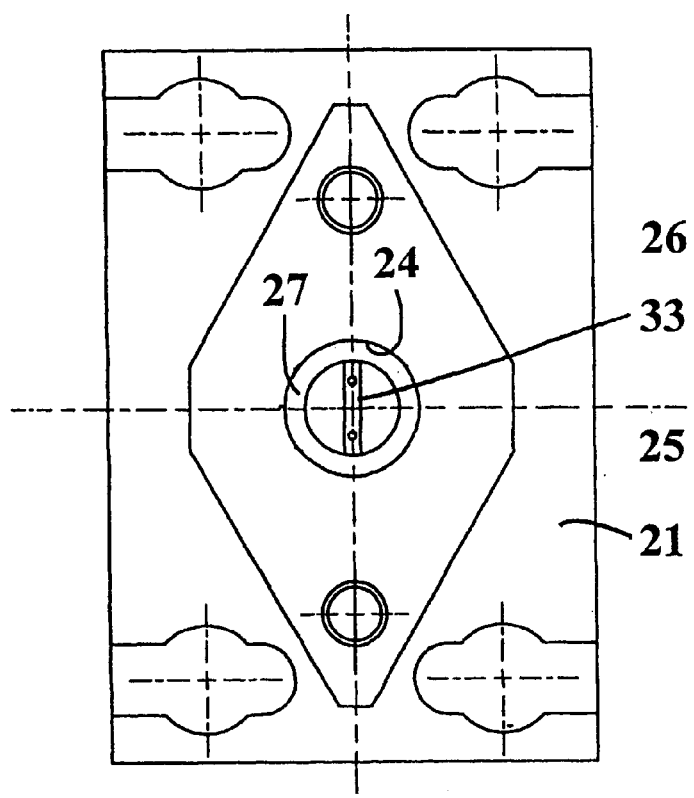
FIG. 2C is a rear elevational view of the apparatus depicted in FIG. 2A.
Figure 2D:
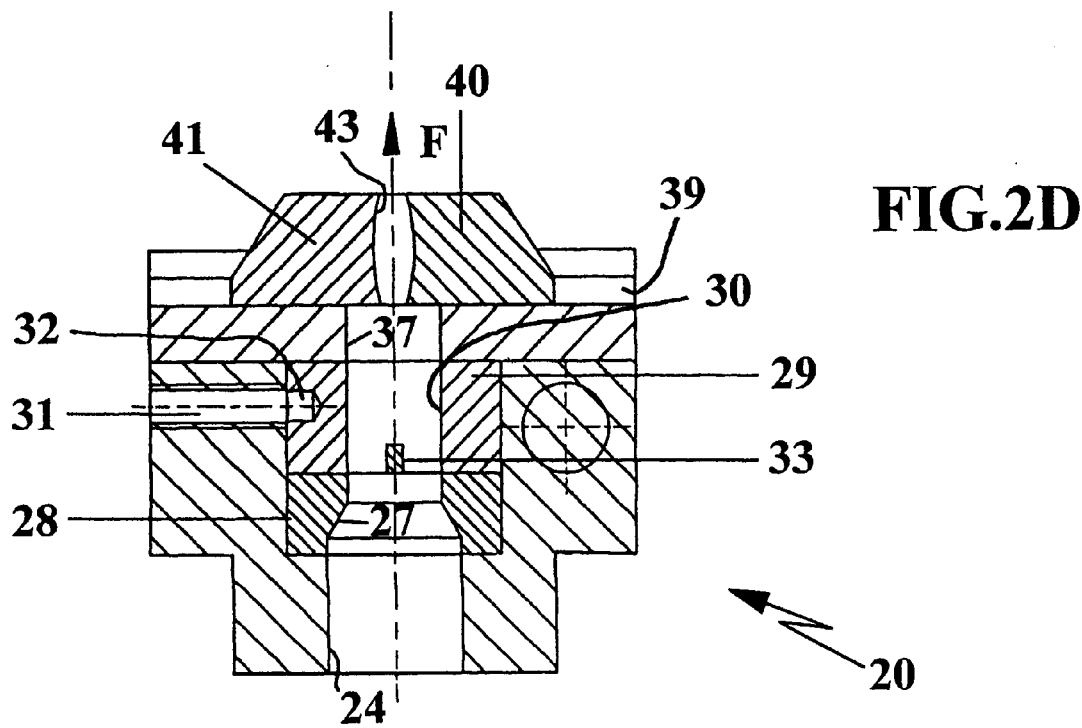
FIG. 2D is a sectional view taken along the line IID—IID in FIG. 2A.

As is obvious from FIGS. 1D and 1E the major part of the cross-sectional area is formed by the tough core portion 12 that is completely surrounded by the wear resistant tube portion 13 except at its ends. A rigid and hard "shell" is thereby obtained on the drill.

Furthermore, the flush channels 14 preferably extend only in the tougher central portion. That is, the minimum thickness X of the core surrounding the flushing channels is at least equal to one-twentieth of D $$\left(\text{i.e., } X \geq \frac{D}{20}\right).$$

Lines of intersection of the chip flutes 18 with the clearance surfaces 15 form the main cutting edges 19, preferably via reinforcing chamfers, not shown.

A device 20 according to the present invention for the production of elongated green bodies is shown in FIGS. 2A–2D. The device 20 comprises a rectangular steel housing 21, which is intended to be fastened by for instance bolts to an extrusion machine 5a (see FIG. 3). The housing 21 has two bolts 22 to be fastened in the machine and has a rear surface 23 intended to seal against said extrusion machine. The housing has a central through-going recess 24 through which at least two compounds will be pressed. The recess 24 transforms into a diameter-reducing restriction 27 disposed in a circular nozzle 28. The nozzle 28 is made from a wear resistant material such as hard metal. The recess 24 then continues via a cylindrical inner, centrally positioned hole 30 into a circular die 29, which is provided next to the nozzle 28. The position of the die 29 relative to the housing is determined by cooperation between a stop screw 31 in the housing and a hole 32 extending laterally relative to the principal feed direction F of the compounds.

A bar-shaped core member 33 is disposed in the die. The core member is rectangular and includes two holes 34 to receive elongated pins 35. The pins 35 are intended to project from the core member in the feed direction F in case flush channels are to be formed in the blank.

The recess 24 then continues in the form of a coaxial hole 37 formed in a lid 36. The lid 36 is attached to the housing by means of two screws 38 and screws 22. The lid 36 is provided with a T-groove 39, which extends between two long sides of the lid 36. The groove 39 is intended to receive two jaws 40, 41, which together form a T-shape, see FIG. 2B. Each jaw 40, 41 includes a recess 42 facing towards the other jaw. Each recess 42 includes a helical ridge 43 shaped to form a chip flute such that when the jaws lie against each other, the recesses form the cross-section of a helix drill having chip flutes. The jaws are pressed against each other in a radial direction, i.e., laterally of a central axis of the device, by suitable power means, not shown, and the same power means is used to separate the jaws, such as when the blank must be non-fluted, for example along a mounting portion of the drill shank. Preferably, a supporting table is placed in connection with the jaws to support the hot extruded blank.

Figure 3:
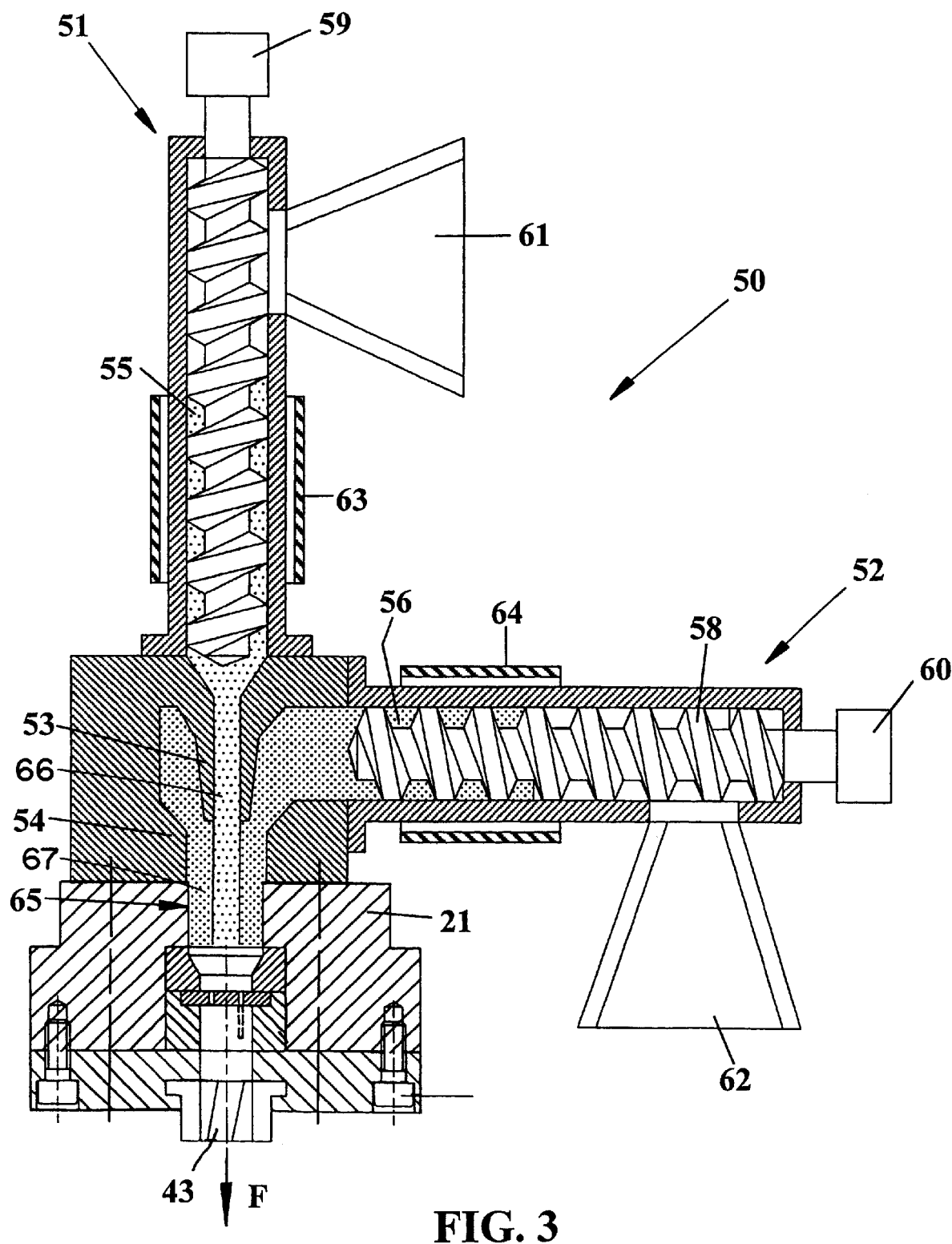
FIG. 3 is a longitudinal sectional view taken through the apparatus depicted in FIG. 2A connected to an extrusion device according to the present invention.

The extrusion machine, or feed device, 50 connected to the housing 21 is shown in FIG. 3. The feed device 50 comprises at least two separate chambers 51, 52. A central one of the chambers 51 is of substantially symmetrical configuration about the feed direction F and comprises a central nozzle 53 facing towards the housing 21. At least one transverse chamber 52 is substantially perpendicular to the feed direction F and comprises a nozzle 54 provided in connection with the nozzle 53. The nozzle 54 is co-axial with the nozzle 53 but is axially closer to the house 21 than is the nozzle 53. The first chamber 51 contains a first compound 55 having a relatively high cobalt ratio, while the second chamber 52 contains a second compound 56 having a lower cobalt ratio. The chambers comprises feed worms 57, 58 to drive the two compounds forwards in the feed direction F. Each feed worm is driven by a motor 59, 60. The granules are fed into funnel-like openings 61, 62. The chambers are at least partially surrounded by heaters 63, 64.

The drill or the end milling cutter is manufactured as follows. Hard metal powder having a certain cobalt content and a carrier, for example a polymer, is mixed into compounds and shaped to pellets or granules. That is done such that at least two different compounds are obtained, where the difference lies in the ratio of cobalt binder which will be the matrix of the green body. The difference in the binder ratio lies within the interval of 1–10 percentage points by weight. The term "cobalt" shall here be understood as a metallic binder that alternatively can be exchanged for or include other metals, for example nickel, Ni.

Then the compounds are preheated to a temperature suitable for the compounds, preferably to the same temperature, and they are inserted into the extrusion machine 50 to be extruded into a rod 65. The compounds are heated to a certain temperature (about 180° C.) in the respective chambers 51, 52 and pressed at high pressure towards the respective nozzles 53, 54, whereby the first plastic compound will form a core 66, and the second plastic compound will abut against said first plastic compound and form a substantially cylindrical rim or tube 67 extending around the core 66. Together, the core 66 and the tube 67 form a rod 65. Then the still-hot rod reaches the core member 33 and passes each side of the core member through the two substantially semi-circular openings formed about the core. The width of the core member 33 (see FIG. 2A) is preferably less than the diameter of the inner compound 66. Rearwardly (downstream) of the core member 33 in the feed direction F, the compounds refuse as a rod. If the pins 35 are provided in the core member 33, then spaces are formed in the inner compound 66, which spaces later will constitute flush channels. The pins are chosen long enough to allow the compound 66 to cool around them such that fusion is avoided.

Then the rod reaches the spacing 42 which is defined by the jaws 40, 41 whereby the rod 65, due to engagement with the ridges 43, moves helically through the jaws and obtain the cross-section of a helix drill. Importantly, the radial depth of the outer tube 67 is made sufficiently large that flutes of adequate depth can be formed entirely therein. Thus, in contrast to the prior art, the chip flutes of the drill made in accordance with the present invention will consist entirely of the more wear resistant hard metal.

When the rod exits the jaws as a tool blank, it cools quickly due to the surrounding temperature, and the blank continues to extrude until the chip flute part is sufficiently long. Subsequently the jaws 40, 41 are drawn apart such that a cylindrical (non-fluted) mounting portion of the shank is formed to be used to mount the tool in a holder. The length of the mounting portion is determined either by how long the extrusion is continued or by when the jaws are displaced back inwardly such that a new blank is initiated. In the latter case two or more blanks are continuous. The solidified blank can then be cut or be broken, for example by hand.

Then the blank is heated in a separate furnace such that the carrier is burned off and such that the binder metal melts and binds the carbide. Then further machining takes place, such as grinding for example at edge portions, shank portion and clearance surfaces.

Thus the outer periphery of the tool obtains a higher wear resistance due to the lower content of binder, for example cobalt, while the center portion is formed of a tougher hard material than the outer periphery due to a greater ratio of cobalt.

With the present method a tool with a long service life can be produced with or without a non-fluted shank portion and allows a simple handling at a low cost. This can be done without generating dust. In addition at least one jaw could function to make marks in the shank portion of the blank where a plane is to be ground for chucking. Thereby the grinding volume can be minimized.

The invention is in no way limited to the above described embodiments but can be varied freely within the scope of the appended claims. Thus the invention can be used also for solid end mills. The tool can be coated with layers of for example $Al_2O_3$, TiN and/or TiCN.

What is claimed is:

1. A tool for chip removing machining, comprising a shank having at least one cutting edge at a front end thereof, and at least one corresponding chip flute for conducting chips generated by the respective cutting edge; a radially central portion of the shank formed of a first hard material; and a radially outer peripheral portion of the shank formed of a second hard material; a cross sectional area of the central portion is larger than the cross sectional area of the outer peripheral portion; the second hard material being harder and less tough than the first hard material; the radially outer peripheral portion being of sufficient thickness that the at least one chip flute is formed entirely therein, and is spaced from the central portion; the first hard material comprising cemented carbide; and further including flush channels extending through the shank solely in the inner portion thereof.

2. The total according to claim 1 wherein the at least one chip flute terminates at a distance from a rear end of the shank.

3. A tool for chip removing machining, comprising a shank having at least one cutting edge at a front end thereof, and at least one corresponding chip flute for conducting chips generated by the respective cutting edge; a radially central portion of the shank formed of a first hard material; a radially outer peripheral portion of the shank formed of a second hard material; the second hard material being harder and less tough than the first hard material; the radially outer peripheral portion being of sufficient thickness that the at least one chip flute is formed entirely therein; further including at least one flush channel extending through the shank solely in the central portion thereof; and wherein a minimum thickness of the central portion surrounding the flush channel is at least equal to one-twentieth of a maximum diameter of the tool.

4. The tool according to claim 2 wherein a cross sectional shape of the central portion is non-cylindrical.

5. A tool for chip removing machining, comprising a shank having at least one cutting edge at a front end thereof, and at least one corresponding chip flute for conducting chips generated by the respective cutting edge; a radially central portion of the shank formed of a first hard material; a radially outer peripheral portion of the shank formed of a second hard material; the second hard material being harder and less tough than the first hard material; the radially outer peripheral portion being of sufficient thickness that the at least one chip flute is formed entirely therein; and further including flush channels extending through the shank, each flush channel defined by a wall formed solely by the central portion and spaced from the outer portion.

6. The tool according to claim 1, wherein a cross sectional area of the central portion is larger than the cross sectional area of the outer peripheral portion.

7. The tool according to claim 6 wherein a cross sectional shape of the central portion is non-cylindrical.

8. The tool according to claim 7 further including flush channels extending through the shank solely in the inner portion thereof.

9. The tool according to claim 1 wherein a cross sectional shape of the central portion is non-cylindrical.

10. The tool according to claim 1 further including flush channels extending through the shank solely in the inner portion thereof.

11. The tool according to claim 1 further including at least one flush channel extending through the shank solely in the inner portion thereof.

12. The tool according to claim 11 wherein a minimum thickness of the central portion surrounding the flush channel is at least equal to one-twentieth of a maximum diameter of the tool.

13. The tool according to claim 1 wherein each of the first and second hard materials comprises the same carbide with the same binder, the first hard material having a higher binder ratio than the second hard material.

14. The tool according to claim 1 wherein a minimum thickness of the outer peripheral portion at a deepest part of the flute is at least as great as one-twentieth of a maximum tool diameter.

15. A tool for chip removing machining, comprising a shank having at least one cutting edge at a front end thereof, and at least one corresponding chip flute for conducting chips generated by the respective cuffing edge; a radially central portion of the shank formed of a first hard material; a radially outer peripheral portion of the shank formed of a second hard material; the second hard material being harder and less tough than the first hard material; the radially outer peripheral portion being of sufficient thickness that the at least one chip flute is formed entirely therein; wherein a cross-sectional area of the central portion is non-cylindrical and larger than the cross-sectional area of the outer peripheral portion; and further including flush channels extending through the shank solely in the central portion thereof.

* * * * *